United States Patent Office 2,859,252
Patented Nov. 4, 1958

---

2,859,252

PRODUCTION OF CHLORINATED POLYPHENYLS

Francis E. Lawlor, Wyndmoor, and Maurice E. Miville, Springfield Township, Montgomery County, Pa., assignors to Pennsalt Chemicals Corporation, a corporation of Pennsylvania No Drawing. Application April 13, 1954
Serial No. 422,992

7 Claims. (Cl. 260—649)

This invention relates to a method for the production of chlorinated polyphenyls from hexachlorocyclohexane, or benzene hexachloride.

In the manufacture of the gamma isomer of benzene hexachloride, which is useful as an insecticide, a large quantity of other isomers of benzene hexachloride is obtained as a by-product, and various procedures have been utilized in an attempt to convert the alpha and beta isomers into useful chemical compositions, since they possess no insecticidal acitivity.

In U. S. Patent 2,569,441 there is disclosed a process in which benzene hexachloride may be converted catalytically to trichlorobenzene, the process comprising the treatment of benzene hexachloride with 0.5 to 5 percent of its weight of anhydrous aluminum chloride at a temperature between 125 and 225° C.

In accordance with the present invention, it has been discovered that chlorinated polyphenyls may be produced from benzene hexachloride by reaction of the benzene hexachloride with a reactive aromatic compound in the presence of an aluminum chloride catalyst. An illustrative reaction that may be involved in the present invention is believed to proceed according to the following equation:

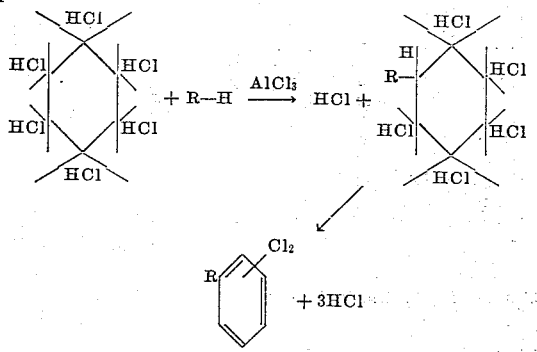

in which R—H is a reactive aromatic compound such as incompletely halogenated benzene derivatives, e. g., mono-, di-, tri- and tetrachloro- and bromo-benzenes, and trichlorofluorobenzene, diphenyl, naphthalene, and the isomeric xylenes. The preferred reactive aromatic compounds are di- and trichlorobenzenes. Exemplary of nonreactive substituted aromatic compounds is nitrobenzene, the use of which fails to produce any chlorinated polyphenyls in the method of the invention. Many reactions other than that shown above are possible and may take place, for example, reactions involving more than one molecule of R—H. Since a mixed product is usually obtained, several such reactions probably take place simultaneously.

The concentration of anhydrous aluminum chloride catalyst may be 2 to 30 percent by weight of the original benzene hexachloride charged, and is preferably 10 to 25 percent by weight of the benzene hexachloride initially present. The effective aluminum chloride concentration depends to a large extent upon the reaction temperature, since, when the reaction temperature is raised rapidly to reflux, much of the aluminum chloride is swept out of the reaction mixture by the hydrogen chloride gas liberated.

The reaction temperature may be within the range of 130 to 225° C., with the reflux temperature of the reaction mixture being within the range of 220 to 225° C. By maintaining the reaction mixture at a temperature of 150 to 170° C. for a period of time before raising the temperature of the reaction mixture to reflux, it has been found that 10 percent by weight of the aluminum chloride catalyst, based upon the benzene hexachloride charged, is as effective as 20 percent by weight when the temperature is rapidly raised to reflux. Good results have been obtained by maintaining the reaction mixture at a temperature of 150 to 170° C. for about 3 hours before heating to reflux temperature. The total reaction time may desirably be in the range of 2 to 30 hours.

The reaction mixture may contain 0.25 to 2 parts by weight of reactive aromatic compound for each part by weight of benzene hexachloride, and preferably the reactive aromatic compound is present in a quantity equivalent to 0.75 to 1.25 parts for each part by weight of benzene hexachloride. Larger quantities of aromatic compound require more aluminum chloride catalyst to obtain complete reaction of the benzene hexachloride, whereas the use of smaller quantities results in a lower yield of chlorinated polyphenyls.

Generally speaking, in the method of the invention benzene hexachloride, a reactive aromatic compound, and anhydrous aluminum chloride catalyst are charged to a reactor, equipped with a condenser and hydrogen chloride absorber, and heated gradually to reflux temperature until evolution of hydrogen chloride ceases. The reaction mixture is then washed, filtered, and chlorinated polyphenyls therein are separated from more volatile materials by distillation.

The invention will be further illustrated by reference to the following specific examples:

*Example 1*

2000 grams of the mixed alpha and beta isomers of benzene hexachloride, 2000 grams of trichlorobenzene, and 91.4 grams of anhydrous aluminum chloride were charged into a 5-liter, 3-necked flask equipped with an agitator, thermometer, and a air-condenser connected to a hydrogen chloride absorber. The mixture was gradually heated, while agitating, and turned dark in color at a temperature of 35° C. Hydrogen chloride gas was evolved when the reaction temperature reached 70° C. and continued while the reaction mixture was gradually heated to a temperature of 215° C. over a period of 6 hours. The reaction mixture was then washed successively with dilute hydrochloric acid solution and water, and then filtered. 2282.3 grams of trichlorobenzene were removed by steam distillation and 806.7 grams of viscous black tar remained in the reaction flask. Assuming this latter material to have an average composition corresponding to pentachlorobiphenyl, the yield was equivalent to 93 percent.

Vacuum distillation of the tarry material yielded the following fractions:

| Sample No. | Boiling point, °C. | Pressure, mm. Hg | Percent of Crude | Appearance |
|---|---|---|---|---|
| 1 | 140-170 | 0.1-0.4 | 35-40 | Slightly yellow viscous liquid. |
| 2 | 200-300 | 1.0-5.0 | 25-30 | Amber, tacky solid. |
| 3 | residue | | 25-30 | Black, friable solid. |

Samples 1 and 2 above are soluble in benzene, trichlorobenzene, acetone, carbon tetrachloride, and petroleum ether, are practically insoluble in ethyl alcohol, and are insoluble in water. Sample 3 is soluble in benzene, trichlorobenzene, and similar aromatic solvents, practically insoluble in acetone, ethyl alcohol, and petroleum ether, and insoluble in water.

Sample 1 boils at a temperature of 140 to 170° C. at a pressure of 0.1 to 0.4 mm. Hg absolute, is a slightly yellowish viscous liquid at room temperature, containing 54 to 56 percent by weight of chlorine, and having a pleasant odor.

Sample 2 boils at a temperature of 200 to 300° C. at a pressure of 1 to 5 mm. Hg absolute, is an amber, tacky solid at room temperature, which softens and melts gradually upon warming, containing 53 percent by weight of chlorine, and having a pleasant odor.

Sample 3 melts at a temperature of 263 to 268° C., is a black, friable solid, very much like anthracite coal in appearance, and contains 45 percent by weight of chlorine.

*Example 2*

Following the general procedure of Example 1 above, a series of runs was made employing various ratios of reactants, quantities of catalyst, reaction times, and reactive aromatic compounds, as indicated in the table below. Except where otherwise noted, the reactive aromatic compound employed was trichlorobenzene (TCB). The results are as follows:

BHC—AlCl₃ REACTION

| Run No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| BHC Charged (g.) | 2,000 | 2,000 | 2,000 | 2,000 | 2,000 | 1,975 | 2,000 | 2,000 | 2,000 | 2,000 | 2,000 | 2,000 | 2,000 | 1,500 |
| TCB Charged (g.) | none | none | 2,000 | none | none | none | none | 2,000 | 2,000 | See note | 2,000 | 1,000 | 4,000 | See note |
| AlCl₃ Charged (g.) | 60 | 60 | 60 | 60 | 60 | 100 | 100 | 100 | 100 | 200 | 100 | 200 | 200 | 150 |
| Percent, AlCl₃ (of BHC) | 3 | 3 | 3 | 3 | 3 | 5 | 5 | 5 | 5 | 10 | 5 | 10 | 10 | 10 |
| Reaction Time (hrs.) | 4 | 20 | 24 | 22 | 20 | 6 | 5 | 5.5 | 4 | 12.5 | 6.5 | 5 | 5 | 4 |
| TCB Recovered (g.) | 880 | 809 | 2,456 | 749 | 672 | 393 | 574 | 2,345 | 2,366 | 1,579 | 1,939 | 1,173 | 3,871 | |
| TCB Yield (percent) | 70 | 65 | 37 | 60 | 54 | 32 | 46 | 28 | 29 | | | 14 | | |
| Tar Produced (g.) | 339 | 359 | 732 | 404 | 488 | 441 | 550 | 755 | 723 | 1,348 | 1,145 | 901 | 1,177 | |
| Tar Yield (percent)* | 30 | 32 | 65 | 36 | 44 | 40 | 49 | 67 | 65 | | | 80 | | |
| | Reaction temp. raised rapidly to reflux. | Reaction temp. raised more slowly than in No. 1 to avoid loss of AlCl₃. | Temp. raised rapidly to 180° C., then most of reaction carried out at 180–190° C. | Temp. held at 160–170° C. for 2 hrs., then raised to 190° C. | Temp. held under 170° C. for 2 hrs., then increased slowly to 190° C. | 500 g. BHC used to obtain low M.P. BHC. Temp. held under 160° C. for 2.5 hrs. | BHC melted at 150–160° C. before adding AlCl₃. Temp. held under 175° C. for 3 hrs. | Temp. held at 150–160° C. for 2.5 hrs., then raised slowly to reflux. | Temp. raised rapidly to reflux. | 2,000 g. o-dichlorobenzene used. Temp. held at 150–175° C. for 3 hrs., then raised to 190° C. | Held temp. at 150–170° C. for 3 hrs., then raised to reflux. | Same temp. as No. 11. | Temp. held at 150–170° C. for 1.5 hrs., then raised to reflux. | 1,500 g. C₆H₅NO₂ used. Little or no reaction as judged by amount of HCl evolved. |

*Assuming that each mole of BHC converted to chlorinated polyphenyl lost 3.5 moles of HCl. The tar is assumed to be essentially all chlorinated polyphenyls.

It will be noted from the above results that the addition of a reactive aromatic compound to the initial reaction mixture in each case resulted in an unexpected increase in production of chlorinated polyphenyls, as distinguished from those cases in which no aromatic compound was initially employed. Compare, for example, runs Nos. 2 and 3. As will also be noted from the above results, dichlorobenzene was equally as effective as trichlorobenzene when employed as the reactive aromatic compound and no reaction was effected when nitrobenzene was employed.

The chlorinated polyphenyls produced by the process of the invention find wide industrial application, e. g., as dielectrics, hydraulic mediums, lubricants, impregnating materials, plasticizers, and additives for use in paints, varnishes and waxes.

It will be obvious to those skilled in the art that many modifications may be made within the scope of the present invention without departing from the spirit thereof, and the invention includes all such modifications.

We claim:

1. The process for producing chlorinated polyphenyls comprising contacting benzene hexachloride in a reaction zone open for the escape of hydrogen chloride with a compound selected from the group consisting of nuclear halogenated aromatic hydrocarbons having at least two aromatic hydrogens and aromatic hydrocarbons having at least two aromatic hydrogens in the presence of aluminum chloride at a temperature of 130 to 225° C., the said materials being initially present at a weight relationship of about 50 to about 200 parts of the aromatic compounds and from 2 to 30 parts of aluminum chloride per 100 parts of benzene hexachloride.

2. The process of claim 1 in which the halogen is chlorine.

3. The process for producing chlorinated polyphenyls comprising contacting benzene hexachloride in a reaction zone open for the escape of hydrogen chloride with trichlorobenzene in the presence of aluminum chloride at a temperature of 130 to 225° C., the said materials being initially present at a weight relationship of about 50 to about 200 parts of the trichlorobenzene and from 2 to 30 parts of aluminum chloride per 100 parts of benzene hexachloride.

4. The process for producing chlorinated polyphenyls comprising contacting benzene hexachloride in a reaction zone open for the escape of hydrogen chloride with dichlorobenzene in the presence of aluminum chloride at a temperature of 130 to 225° C., the said materials being initially present at a weight relationship of about 50 to about 200 parts of the dichlorobenzene and from 2 to 30 parts of aluminum chloride per 100 parts of benzene hexachloride.

5. The process for producing chlorinated polyphenyls comprising contacting benzene hexachloride in a reaction zone open for the escape of hydrogen chloride with diphenyl in the presence of aluminum chloride at a temperature of 130 to 225° C., the said materials being initially present at a weight relationship of about 50 to about 200 parts of the diphenyl and from 2 to 30 parts of aluminum chloride per 100 parts of benzene hexachloride.

6. The process for producing chlorinated polyphenyls comprising contacting benzene hexachloride in a reaction zone open for the escape of hydrogen chloride with monochlorobenzene in the presence of aluminum chloride at a temperature of 130 to 225° C., the said materials being initially present at a weight relationship of about 50 to about 200 parts of the monochlorobenzene and from 2 to 30 parts of aluminum chloride per 100 parts of benzene hexachloride.

7. The process for producing chlorinated polyphenyls comprising contacting benzene hexachloride in a reaction zone open for the escape of hydrogen chloride with trichlorofluorobenzene in the presence of aluminum chloride at a temperature of 130 to 225° C., the said materials being initially present at a weight relationship of about 50 to about 200 parts of the trichlorofluorobenzene and from 2 to 30 parts of aluminum chloride per 100 parts of benzene hexachloride.

References Cited in the file of this patent

UNITED STATES PATENTS

| | | |
|---|---|---|
| 2,569,441 | Alquist et al. | Oct. 2, 1951 |
| 2,742,508 | Johnson | Apr. 17, 1956 |